United States Patent Office 3,823,236
Patented July 9, 1974

---

3,823,236
2-ACYLOXYBENZOIC ACID ANILIDE FUNGICIDAL AND BACTERICIDAL AGENTS
Karl Heinz Büchel, Wuppertal-Elberfeld, Ferdinand Grewe, Burscheid, and Hans Scheinpflug, Leverkusen, Germany, assignors to Bayer Aktiengesellschaft, Leverkusen, Germany
No Drawing. Filed Apr. 21, 1972, Ser. No. 246,442
Claims priority, application Germany, Apr. 28, 1971, P 21 20 861.7
Int. Cl. A01n 9/20, 9/24
U.S. Cl. 424—230  11 Claims

ABSTRACT OF THE DISCLOSURE

Fungicidal and bactericidal compositions containing, and methods of combating fungi and bacteria using, a 2-acyloxybenzoic acid anilide of the general formula

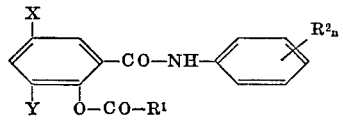

in which $R^1$ is alkyl or alkoxy of 1 to 6 carbon atoms,
X and Y each independently is chlorine, bromine or tertiary butyl, or X is hydrogen provided that Y is nitro, or Y is hydrogen provided that X is chlorine and $R^1$ is alkoxy or 1 to 4 carbon atoms,
$n$ is 1, 2, 3, or 4, and
$R^2$ is lower alkyl, halo-lower alkyl, halogen, nitro, lower alkoxycarbonyloxy, lower alkoxy or lower alkymercapto.

---

The present invention relates to and has for its objects the provision of certain 2-acyloxybenzoic acid anilides, i.e. 2-lower acyloxy- or 2 - lower alkoxy-carbonyloxy-benzoic acid anilides substituted on each benzene ring by at least one halo, nitro, lower alkyl, halo-lower alkyl, lower alkoxy, lower alkylmercapto or lower alkoxycarbonyloxy group, which possess valuable fungicidal and bactericidal activity, active compositions in the form of mixtures of such compounds with solid and liquid dispersible carrier vehicles, and methods for using such compounds in a new way especially for combating and controlling fungi and bacteria with other and further objects becoming apparent from a study of the within specification and accompanying examples.

It has been disclosed in Mem. Shirley Inst., 9 (1930), p. 37 and U.S. Patent Specification 3,281,465 that 2-hydroxybenzoic acid anilide (Compound A) and its 4'-bromo derivative display fungicidal and bactericidal properties. The fungicidal activity of these compounds is, however, or not always fully satisfactory if low concentrations are used.

It has now been found that the new 2-acyloxybenzoic acid anilides of the general formula

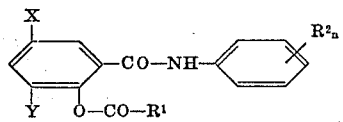

in which $R^1$ is alkyl or alkoxy of 1 to 6 carbon atoms,
X and Y each independently is chlorine, bromine or tertiary butyl, or X is hydrogen provided that Y is nitro, or Y is hydrogen provided that X is chlorine and $R^1$ is alkoxy of 1 to 4 carbon atoms,
$n$ is 1, 2, 3 or 4, and
$R^2$ is lower alkyl, halo-lower alkyl, halogen, nitro, lower alkoxycarbonyloxy, lower alkoxy or lower alkylmercapto, display excellent fungicidal properties as well as bactericidal activity.

Surprisingly, the 2-acyloxybenzoic acid anilides of the formula (I) are substantially more effective against plant-pathogenic fungi than the above-mentioned 2-hydroxybenzoic acid anilide which is chemically the nearest substance of the same direction of activity. As compared to the prior-art substances, the compounds of the formula (I) are above all also distinguished by a broader spectrum of action, for example by the fact that they are also very effective against true mildew fungi of the family of the *Erysiphaceae*. The present invention thus represents a valuable enrichment of the art.

The 2-acyloxybenzoic acid anilides of the formula (I) are obtained if 2-hydroxybenzoic acid anilides or their salts, of the general formula

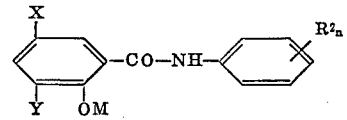

in which

X, Y, $R^2$ and $n$ have the meanings stated above, and
M is hydrogen or an equivalent of a cation, are reacted with acid chlorides of the formula

$$R^1—CO—Cl \quad (III),$$

in which $R^1$ has the meaning stated above, optionally in the presence of acid-binding agents and optionally in the presence of a diluent. The compounds of the formula (I) and the foregoing preparative process are the subject of now pending Application Ser. No. 246,011, filed Apr. 20, 1973.

The active compounds of the formula (I) display a strong fungitoxic action against phytopathogenic fungi. Their good toleration by warm-blooded animals and by higher plants permits them to be used as plant-protection agents against fungal diseases. They do not harm crop plants in the concentrations required for combating the fungi. In the fungitoxically active concentrations they do not exert an irritant effect on the skin and mucous membranes.

Fungitoxic agents are employed in plant protection for combating fungi from the most diverse classes of fungi, such as *Archimycetes*, *Phycomycetes*, *Ascomycetes*, *Basidiomycetes* and *Fungi Imperfecti*.

The active compounds according to the invention have a very broad spectrum of action and are active, for example, against parasitary fungi on above-ground parts of plants, fungi that cause tracheomycosis and that attack the plants through the soil, seed-borne fungi and soil fungi.

The active compounds display a particularly high fungicidal potency against true mildew fungi from the family of the Erysiphaceae, for example against fungi of the genera *Erysiphe*, *Oidium* and *Podospaera* and against fungi of the genus *Fusicladium*. The active compounds can, however, also be used with good success for combating other phytopathogenic fungi, for example fungi that cause diseases in rice plants or other crop plants. The active compounds show a very good action against *Piricularia oryzae*, *Pellicularia sasakii* and *Cochliobolus miyabeanus*, three pathogens that occur in rice plants, and against *Colletotrichum coffeanum* in coffee, *Mycosphaerella musicola* in bananas, varieties of *Cerospora* and varieties of *Alternaria*. They further inhibit fungi that cause tracheomycosis and that attack the plants through the soil, for example *Phialophora cinerescens*, *Fusarium oxysporum* and *Verticillium alboatrum*.

Additionally, some of the compounds of the formula (I) display a good action against seed-borne fungi and phytopathogenic soil fungi and are particularly active against smut and mildew diseases of cereals.

The bactericidal action of the active compounds, for example against *Xanthomonas oryzae* on rice, should also be mentioned.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated aromatic hydrocarbons (e.g. chlorobenzenes, etc.), cycloalkanes (e.g. cyclohexene, etc), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomehtyl ether, etc., amines (e.g. ethanolamine, etc.), amides (e.g. dimethyl formamide, etc), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as fungicides and bactericides or insecticides, acaricides, rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–5%, preferably 0.001–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95% and preferably 0.1–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, perferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. fungi and bacteria, which comprises applying to at least one of correspondingly (a) such fungi, (b) such bacteria, and (c) the corresponding habitat thereof, i.e. the locus to be protected, a correspondingly combative or toxic amount, i.e. a fungicidally or bactericidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, or course, that the concentration of the particular active compound utilized in admixture with the carrier vehicle will depend upon the intended application. Therefore, in special cases it is possible to It will be realized, of course, that the concentration ranges.

The synthesis, unexpected superiority and outstanding activity of the particular new compounds of the present invention are illustrated, without limitation, by the following examples:

EXAMPLE 1

Piricularia test: liquid preparation of active compound

Solvent: 1.9 parts by weight DMF
Dispersing agent: 0.1 part by weight emulsifier Emulvin W
Water: 98 parts by weight water.

The amount of active compound required for the desired concentration in the spray liquor is mixed with the stated amount of solvent, and the concentrate is diluted with the stated amount of water containing the stated dispersing agent.

30 rice plants about 14 days old are sprayed with the spray liquor until dripping wet. The plants remain in a greenhouse at temperatures of 22 to 24° C. and a relative atmospheric humidity of about 70% until they are dry. They are then inoculated with an aqueous suspension of 100,000 to 200,000 spores/ml. of *Piricularia oryzae* and placed in a chamber at 24–26° C. and 100% relative atmospheric humidity.

5 days after inoculation, the infection of all the leaves present at the time of inoculation is determined as a percentage of the untreated but also inoculated control plants. 0% means no infection; 100% means that the infection is exactly as great in the case of the control plants.

The active compounds, the concentrations of the active compounds and the results can be seen from the following Table 1.

TABLE 1
[Piricularia test: Liquid preparation of the active compound]

| Active compound | | Attack in percent of the attack of the untreated control at an active compound concentration (in percent) of— | |
|---|---|---|---|
| (A) | ⌬—CO—NH—⌬ <br> OH <br> (known) | 0.05 | 100 |
| (27) | Br  Cl <br> ⌬—CO—NH—⌬—Cl <br> Br  O—CO—OCH₂—CH(CH₃)₂ | 0.05 <br> 0.025 | 0 <br> 0 |
| (17) | Cl  Br <br> ⌬—CO—NH—⌬—Br <br> Cl  Br <br> O—CO—OCH₃ | 0.05 <br> 0.025 | 0 <br> 25 |

EXAMPLE 2

Pellicularia test: liquid preparation of active compound

Solvent: 1.9 parts by weight dimethyl formamide
Dispersing agent: 0.1 part by weight alkylarylpolyglycol ether
Water: 98 parts by weight.

The amount of active compound required for the desired concentration of active compound in the spray liquor is mixed with the stated amount of the solvent and of the dispersing agent, and the concentrate is diluted with the stated amount of water.

30 rice plants about 14 days old are sprayed with the spray liquor until dripping wet. The plants remain in a greenhouse at temperatures of 22 to 24° C. and a relative atmospheric humidity of about 70% until they are dry. They are then inoculated with an aqueous suspension of 100,000 to 200,000 spores/ml. of *Pellicularia sasakii* and placed in a chamber at 24–26° C. and 100% relative atmospheric humidity.

Five days after inoculation, the infection of all the leaves present at the time of inoculation is determined as a percentage of the untreated but also inoculated control plants. 0% means no infection; 100% means that the infection is exactly as great as in the case of the control plants.

The active compounds, the concentrations of the active compounds and the results can be seen from the following Table 2:

TABLE 2
[Pellicularia test: Liquid preparation of the active compound]

| Active compound | | Attack in percent of the attack of the untreated control at an active compound concentration (in percent) of— | |
|---|---|---|---|
| (A) | ⌬—CO—NH—⌬ <br> OH <br> (Known) | 0.05 | 100 |
| (23) | Br  Cl  Cl <br> ⌬—CO—NH—⌬ <br> Br  O—CO—OC₂H₅ | 0.05 | 25 |
| (54) | Cl  Cl <br> ⌬—CO—NH—⌬ <br> O—CO—OC₂H₅ | 0.05 | 0 |

EXAMPLE 3

Mycelium growth test
Nutrient medium used:
  20 parts by weight agar-agar
  200 parts by weight potato decoction
  5 parts by weight malt
  15 parts by weight dextrose
  5 parts by weight peptone
  2 parts by weight Na₂HPO₄
  0.3 parts by weight Ca(NO₃)₂

Proportion of solvent to nutrient medium:
  2 parts by weight acetone
  100 parts by weight agar nutrient medium.

The amount of active compound required for the desired concentration of active compound in the nutrient medium is mixed with the stated amount of solvent. The concentrate in the stated proportion, is thoroughly mixed with the liquid nutrient medium which has been cooled to 42° C. and is then poured into Petri dishes of 9 cm. diameter. Control dishes to which the preparation has not been added are also set up.

When the nutrient medium has cooled and solidified, the dishes are inoculated with the species of fungi stated in Table 3 and incubated at about 21° C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0 = no fungus growth
1 = very strong inhibition of growth
2 = medium inhibition of growth
3 = slight inhibition of growth
4 = growth equal to that of untreated control.

The active compounds, their concentrations and the results obtained can be seen from Table 3.

TABLE 3.—MYCELIUM GROWTH TEST

| Active compounds | Active compound concentration, p.p.m. | Fungi | | | | | |
|---|---|---|---|---|---|---|---|
| | | Piricularia oryzae | Phialophora cinerescens | Mycosphaerella musicola | Verticillium alboatrum | Cochliobulus miyabeanus | Colletotrichum coffeanum |
| (A) ⌬—CO—NH—⌬  OH  (Known) | 10 | 1 | 4 | 1 | 4 | 3 | 0 |
| (54) Cl—⌬—CO—NH—⌬—Cl  O—CO—OC₂H₅ | 10 | 0 | ....... | 0 | 0 | 2 | 1 |
| (55) Cl—⌬—CO—NH—⌬—Cl  O—CO—OC₂H₅ | 10 | 0 | 0 | 0 | 0 | 0 | 0 |

EXAMPLE 4

Bacteria test: *Xanthomonas oryzae*

Solvent: 1.9 parts by weight dimethyl formamide
Dispersing agent: 0.1 part by weight alkylarylpolyglycol ether
Water: 98 parts by weight.

The amount of active compound necessary for the desired concentration of active compound in the spray liquor is mixed with the stated amount of the solvent and of the dispersing agent, and the concentrate is diluted with the stated amount of water.

30 rice plants about 30 days old are sprayed with the spray liquor until dripping wet. The plants remain in a greenhouse at temperatures of 22 to 24° C. and a relative atmospheric humidity of about 70% until they are dry. Needles are then dipped into an aqueous bacterial suspension of *Xanthomonas oryzae* and the plants are inoculated by pricking the leaves. After inoculation, the plants stand in a chamber of 26 to 28° C. and 80% relative atmospheric humidity.

10 days after inoculation, the infection in the case of all the leaves injured by pricking, inoculated and previously treated with the preparation is determined as a percentage of the untreated but likewise inoculated leaves of the control plants. 0% denotes no infection; 100% means that the infection is exactly as great as in the case of the control plants.

The active compounds, the concentration of active compound and the results can be seen from the following Table:

TABLE 4
[Bacteria test: *Xanthomonas Oryzal*]

| Active compound | | Attack in percent of the attack of the untreated control at an active compound concentration (in percent) of— | |
|---|---|---|---|
| (A) ⌬—CO—NH—⌬  OH  (known) | | 0.05 | 50 |
| (3) ⌬—CO—NH—⌬—NO₂  NO₂  O—CO—OC₂H₅ | | 0.05  0.025 | 25  50 |
| (2) Cl—⌬—CO—NH—⌬—CF₃  Br  O—CO—C₂H₅  Cl | | 0.05 | 29 |
| (35) Cl—⌬—CO—NH—⌬—CH(CH₃)₂  Br  O—CO—CH₃  CH(CH₃)₂ | | 0.05  0.025 | 8  33 |

EXAMPLE 5

Podosphaera test (powdery mildew of apples) (Protective)

Solvent: 4.7 parts by weight acetone
Emulsifier: 0.3 parts by weight alkylaryl polyglycol ether
Water: 95 parts by weight.

The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated by dusting with conidia of the apple powdery mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

The active compounds, the concentrations of the active compounds and the results obtained can be seen from the following Table:

TABLE 5
[Podosphaera test: Protective]

| Active compound | | Attack in percent of the attack of the untreated control at an active compound concentration (in percent) of— | | |
|---|---|---|---|---|
| | | 0.025 | 0.0062 | 0.00156 |
| (B) | Wettable sulfur (Known) | 3 | 24 | |
| (7) | Cl–[benzene(Br, O–CO–CH₃)]–CO–NH–[benzene(CF₃, CF₃)] | 0 | 0 | 0 |
| (8) | Cl–[benzene(Br, O–CO–C₂H₅)]–CO–NH–[benzene(CF₃, CF₃)] | 0 | 0 | 1 |
| (1) | Cl–[benzene(Br, O–CO–COH₃)]–CO–NH–[benzene(CF₃, CF₃)] | 0 | 0 | 6 |
| (2) | Cl–[benzene(Br, O–CO–C₂H₅)]–CO–NH–[benzene(CF₃, Cl)] | 0 | 3 | 15 |
| (56) | Br–[benzene(Br, O–CO–CH₃)]–CO–NH–[benzene(CF₃, CF₃)] | 0 | 4 | 7 |
| (50) | C(CH₃)₃–[benzene(Br, O–CO–OCH₃)]–CO–NH–[benzene(CF₃, CF₃)] | 0 | 11 | |

EXAMPLE 6

Fusicladium test (apple scab) (Protective)

Solvent: 4.7 parts by weight acetone
Emulsifier: 0.3 parts by weight alkylaryl polyglycol ether
Water: 95 parts by weight.

The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated with an aqueous conidium suspension of the apple scab causative organism (*Fusicladium dendriticum* Fuckel) and incubated for 18 hours in a humidity chamber at 18–20° C. and at a relative atmospheric humidity of 100%.

The plants then again come into a greenhouse for 14 days.

15 days after inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results can be seen from Table 6:

TABLE 6
[Fusicladium test: Protective]

| Active compound | Attack in percent of the attack of the untreated control at an active compound concentration (in percent) of 0.025 |
|---|---|
| (C) CH₃\N–C–S–S–C–N/CH₃ / \ \\ \\ / \ CH₃ S S CH₃ (Known) | 22 |
| (57) [benzene(O₂N, O–CO–C₃H₇)]–CO–NH–[benzene(Cl, NO₂)] | 7 |

The preparation of the compounds of the formula (I) is illustrated in and by the following Examples:

EXAMPLE 7

(a)

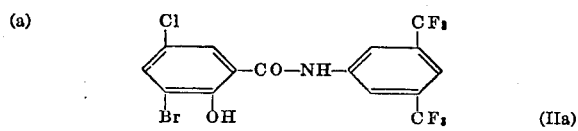

(IIa)

52 g. (0.22 mole) of 5-chloro-3-bromosalicylic acid chloride and 62 g. (0.27 mole) of 3,5-bis-trifluoromethylaniline in 800 ml. of anhydrous xylene are heated for 6 hours under reflux. The solution is filtered while still hot. The precipitate that results on cooling is filtered off and rinsed with petroleum ether. 78 g. (87.5% of theory) of 3-bromo - 5 - chloro-3',5'-bis-trifluoromethyl - 2 - hydroxybenzoic acid anilide are obtained as pale yellow crystals of melting point 167° C.

(b) 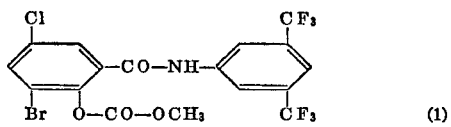   (1)

3.5 g. (0.04 mole) of pyridine are added to a solution of 20 g. (0.043 mole) of 3-bromo-5-chloro-3',5'-bis-trifluoromethyl-2-hydroxy-benzoic acid anilide in 400 ml. of anhydrous benzene. Thereafter a solution of 6.2 g. (0.065 mole) of chloroformic acid methyl ester in 50 ml. of anhydrous benzene is slowly added dropwise at a temperature of 20° to 28° C. The reaction mixture is heated for sixteen hours at 35° C. and then cooled to room temperature; the solvent is distilled off *in vacuo*.

The resulting oily residue is triturated with methanol. This yields a solid which is recrystallized from 300 ml. of methanol.

12 g. (54% of theory) of 3-bromo-5-chloro-3',5'-bis-trifluoromethyl-2-methoxycarbonyloxy - benzoic acid anilide are obtained as colorless crystals of melting point 132°–133° C.

EXAMPLE 8

(a) 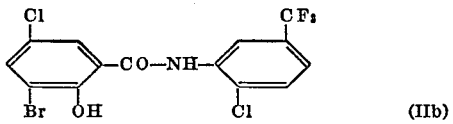   (IIb)

54 g. (0.2 mole) of 3-bromo-5-chloro-2-hydroxy-benzoic acid chloride and 53 g. (0.27 mole) of 4-chloro-3-amino-benzotrifluoride in 800 ml. of anhydrous xylene are heated to the boil for 6 hours. The solution is filtered while still hot and left to cool. Pale yellow crystals, which are well washed with petroleum ether, are obtained in a yield of 65.7 g. (83% of theory); their melting point is 154–156° C.

(b) 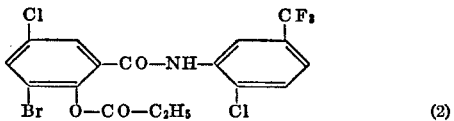   (2)

3.7 g. (0.046 mole) of pyridine are added to a solution of 20 g. (0.046 mole) of 3-bromo-2',5-dichloro-2-hydroxy-5'-trifluoromethyl-benzoic acid anilide in 400 ml. anhydrous benzene; a solution of 4.5 g. (0.05 mole) of propionyl chloride in 50 ml. of benzene is then slowly added dropwise at a temperature between 20° and 30° C. After 16 hours' reaction time at 35° C., the pyridine hydrochloride produced at the same time is filtered off hot, the solution is evaporated and the residue is recrystallized from ligroin. 18.5 g. (82% of the theory) of 3-bromo-2',5-dichloro-5'-trifluoromethyl-2-propionoxybenzoic acid anilide of melting point 117° C. are obtained.

EXAMPLE 9

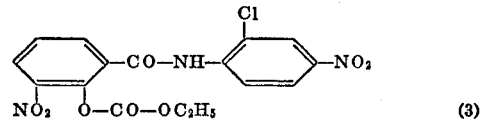   (3)

A sodium ethylate solution of 2.3 g. (0.1 mole) of sodium in 200 ml. of anhydrous ethanol is first added to a suspension of 33.7 g. (0.17 mole) of 2'-chloro-2-hydroxy-3,4'-dinitrobenzoic acid anilide in 350 ml. of anhydrous acetonitrile. 11.9 g. (0.15 mole) of chloroformic acid ethyl ester in 50 ml. of anhydrous acetonitrile are thereafter added dropwise at room temperature.

After a reaction time of 24 hours, the sodium chloride produced is centrifuged off, the solvent is distilled off *in vacuo* and the oily residue is rinsed with methanol.

15 g. (34% of theory) of 2'-chloro-3,4'-dinitro-2-ethoxycarbonyloxybenzoic acid anilide of melting point 146–150° C. are obtained.

The compounds identified in the following Table may be prepared by methods analogous to those described above.

TABLE

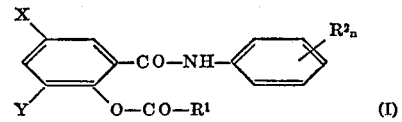   (I)

| Compound | X | Y | R¹ | R²ₙ | Melting point, ° C. |
|---|---|---|---|---|---|
| (4) | Br | Br | CH₃ | 2',6'-CH(CH₃)₂ | 167 |
| (5) | Br | Br | C₂H₅ | 2',6'-CH(CH₃)₂ | 1 6 |
| (6) | Cl | Cl | C₂H₅ | 2',6'-CH(CH₃)₂ | 155 |
| (7) | Cl | Br | CH₃ | 3',5'-CF₃ | 170–171 |
| (8) | Cl | Br | C₂H₅ | 3',5'-CF₃ | 146–148 |
| (9) | Cl | Br | OCH₃ | 2'-Cl-5'-CF₃ | 134–135 |
| (10) | Cl | Br | CH₃ | 2'-Cl-5'-CF₃ | 155 |
| (11) | Br | Br | OCH₃ | 3',5'-CF₃ | 145–147 |
| (12) | Br | Br | OCH₃ | 2'-Cl-5'-CF₃ | 132–134 |
| (13) | Cl | Cl | C₂H₅ | 2'-Cl-5'-CF₃ | 93 |
| (14) | Br | Br | OCH₃ | 2',6'-CH₃ | 161 |
| (15) | Cl | Br | OCH₃ | 2',6'-C₂H₅ | 146 |
| (16) | C(CH₃)₃ | Br | OCH₃ | 2',4',6'-Br | 183 |
| (17) | Cl | Cl | OCH₃ | 2',4',6'-Br | 175 |
| (18) | Cl | Cl | OC₂H₅ | 3'-Cl | 125–129 |
| (19) | Cl | Cl | OC₂H₅ | 4'-Cl | 148 |
| (20) | Cl | Cl | OC₂H₅ | 2',4',5'-Cl | 142–144 |
| (21) | Cl | Cl | OC₂H₅ | 3',5'-Cl-4'-SCH₃ | 140–143 |
| (22) | Br | Br | OC₂H₅ | 4'-Br | 179 |
| (23) | Br | Br | OC₂H₅ | 2',3'-Cl | 130 |
| (24) | H | NO₂ | OC₂H₅ | 4'-Cl | 133 |
| (25) | Cl | Cl | OC₂H₅ | 2',3',5'-Cl-6'-O—CO—OC₂H₅ | 163–165 |
| (26) | Br | Br | OC₄H₉ | 2',4'-Cl | 99–101 |
| (27) | Br | Br | OCH₂—CH(CH₃)₂ | 2',4'-Cl | 152 |
| (28) | Cl | Cl | OCH₂—CH(CH₃)—CH₃ | 2',4',6'-Br | 136–139 |
| (29) | Br | Br | OCH₃ | 2',6'-CH₃ | 161 |
| (30) | Br | Br | CH₃ | 2'-Cl-5'-CF₃ | 176–178 |
| (31) | Br | Br | C₂H₅ | 2'-Cl-5'-CF₃ | 136–137 |
| (32) | Cl | Br | CH₃ | 2',6'-CH₃ | 192–194 |
| (33) | Cl | Br | OCH₃ | 2',6'-CH₃ | 158 |
| (34) | Cl | Br | OC₂H₅ | 2'-Cl-5'-CF₃ | 98 |
| (35) | Cl | Br | CH₃ | 2',6'-CH(CH₃)₂ | 166 |
| (36) | Cl | Br | C₂H₅ | 2',6'-CH(CH₃)₂ | 155 |
| (37) | Cl | Cl | CH₃ | 2',6'-CH(CH₃)₂ | 169–170 |

TABLE—Continued

| Compound | X | Y | R¹ | R²ₙ | Melting point, °C |
|---|---|---|---|---|---|
| (38) | Cl | Cl | $C_2H_5$ | 2',6'-CH(CH₃)₂ | 155 |
| (39) | Cl | Cl | $OCH_3$ | 2',6'-CH(CH₃)₂ | 144 |
| (40) | Cl | Cl | $CH_3$ | 2',6'-CH₃ | 185-186 |
| (41) | Cl | Cl | $C_2H_5$ | 2',6'-CH₃ | 155-156 |
| (42) | Cl | Cl | $OCH_3$ | 2',6'-CH₃ | 153 |
| (43) | Cl | Cl | $CH_3$ | 2'-Cl-5'-CF₃ | 152 |
| (44) | Cl | Cl | $OCH_3$ | 2'-Cl-5'-CF₃ | 129 |
| (45) | Cl | Br | $CH_3$ | 2',6'-C₂H₅ | 179 |
| (46) | Cl | Br | $C_2H_5$ | 2',6'-C₂H₅-6'-O—CO—OC₂H₅ | 169 |
| (47) | Cl | Br | $C_2H_5$ | 2',6'-CH₃ | 164-166 |
| (48) | Cl | Br | $OCH_3$ | 2',6'-CH(CH₃)₂ | 135-137 |
| (49) | C(CH₃)₃ | Br | $CH_3$ | 3',5'-CF₃ | 211 |
| (50) | C(CH₃)₃ | Br | $OCH_3$ | 3',5'-CF₃ | 164 |
| (51) | C(CH₃)₃ | Br | $OCH_3$ | 2'-Cl-5'-CF₃ | 122-123 |
| (52) | C(CH₃)₃ | Br | $CH_3$ | 2'-Cl-5'-CF₃ | 146 |
| (53) | C(CH₃)₃ | Br | $CH_3$ | 2',4',6'-Br | 195 |
| (54) | Cl | H | $OC_2H_5$ | 2'-Cl | 93-95 |
| (55) | Cl | H | $OC_2H_5$ | 4'-Cl | 110 |
| (56) | Br | Br | $CH_3$ | 3',5'-CF₃ | 173-174 |
| (57) | H | NO₂ | $C_3H_7$ | 2'-Cl-4'-NO₂ | 75-79 |
| (58) | Cl | Cl | $OCH_3$ | 3',5'-CF₃ | 144-146 |
| (59) | Br | Br | $C_2H_5$ | 3,5-CF₃ | 166-168 |

Preferred compounds are those in which R¹ is straight or branched lower alkyl or alkoxy with up to 4 carbon atoms, R² is chlorine, bromine, nitro and/or trihalomethyl, n is 1 or 2, X is chlorine or bromine, or X is hydrogen provided that Y is nitro, and Y is chlorine, bromine or nitro, or Y is hydrogen provided that X is chlorine and R¹ is alkoxy with up to 4 carbon atoms.

It will be appreciated that the instant specification and examples are set forth by way of illustration and not limitation, and that various modifications and changes may be made without departing from the spirit and scope of the present invention.

What is claimed is:

1. A fungicidal or bactericidal composition comprising a fungicidally or bactericidally effective amount of 2-acyloxybenzoic acid anilide of the formula

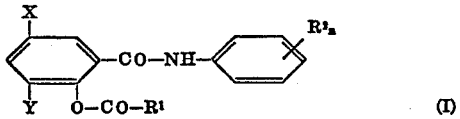

in which
R¹ is alkyl or alkoxy of 1 to 6 carbon atoms,
X and Y each independently is chlorine, bromine or tertiary butyl, or X is hydrogen provided that Y is nitro, or Y is hydrogen provided that X is chlorine and R¹ is alkoxy of 1 to 4 carbon atoms,
n is 1, 2, 3 or 4, and
R² is lower alkyl, halo-lower alkyl, halogen, nitro, lower alkoxycarbonyloxy or lower alkylmercapto,
in admixture with a compatible carrier.

2. The fungicidal or bactericidal composition according to claim 1 wherein said 2-acyloxybenzoic acid anilide is:
3 - bromo - 5 - chloro - 3' - 5' - bis-trifluoromethyl-2-methylcarbonyloxy-benzoic acid anilide,
3 - bromo - 5 - chloro - 3',5' - bis-trifluoromethyl-2-ethylcarbonyloxy-benzoic acid anilide,
3,5 - di - bromo - 2',4' - di-chloro-2-isobutoxycarbonyloxybenzoic acid anilide,
3 - bromo - 5 - chloro - 2',6' - di - isopropyl-2-methylcarbonyloxybenzoic acid anilide,
2',5 - di - chloro - 2 - ethoxycarbonyloxy-benzoic acid anilide, or
4',5 - dichloro - 2 - ethoxycarbonyloxy-benzoic acid anilide.

3. A method of combating fungi or bacteria which comprises applying to a (a) such fungi, (b) such bacteria, (c) a fungus habitat or (d) a bacterium habitat a fungicidally or bactericidally effective amount of a 2-acyloxybenzoic acid anilide of the formula

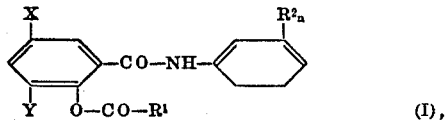

in which
R¹ is alkyl or alkoxy of 1 to 6 carbon atoms,
X and Y each independently is chlorine, bromine or tertiary butyl, or X is hydrogen provided that Y is hydrogen provided that X is chlorine and R¹ is alkoxy of 1 to 4 carbon atoms,
n is 1, 2, 3 or 4, and
R² is lower alkyl, halo-lower alkyl, halogen, nitro, lower alkoxycarbonyloxy or lower alkylmercapto.

4. The method of claim 3 wherein said 2-acyloxybenzoic acid anilide is 3-bromo-5-chloro-3',5'-bis-trifluoromethyl - 2 - methylcarbonyloxy-benzoic acid anilide of the formula

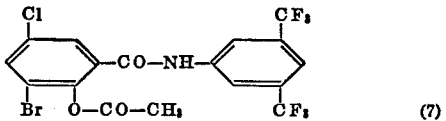

5. The method of claim 3 wherein said 2-acyloxybenzoic acid anilide is 3 - bromo-5-chloro-3',5'-bis-trifluoromethyl - 2 - ethylcarbonyloxy-benzoic acid anilide of the formula

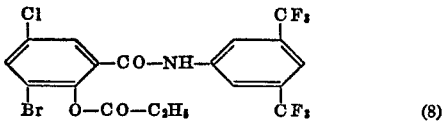

6. The method of claim 3 wherein said 2-acyloxybenzoic acid anilide is 3,5 - di - bromo-2',4'-di-chloro-2-isobutoxycarbonyloxy-benzoic acid anilide of the formula

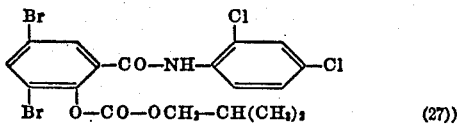

7. The method of claim 3 wherein said 2-acyloxybenzoic acid anilide is 3 - bromo - 5 - chloro - 2',6'-di-isopropyl-2-methylcarbonyloxy-benzoic acid anilide of the formula

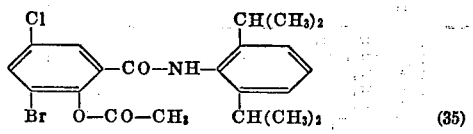
(35)

8. The method of claim 3 wherein said 2-acyloxybenzoic acid anilide is 2′,5-di-chloro-2-ethoxycarbonyloxy-benzoic acid anilide of the formula

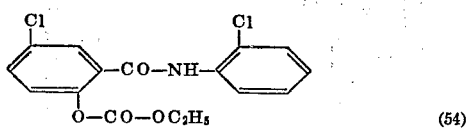
(54)

9. The method of claim 3 wherein said 2-acyloxybenzoic acid anilide is 4′,5-di-chloro-2-ethoxycarbonyloxy-benzoic acid anilide of the formula

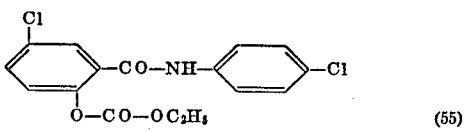
(55)

10. The method of claim 3 wherein said 2-acyloxybenzoic anilide is 2′,3,5-tri-chloro-2-ethylcarbonyloxy-5′-trifluoromethyl-benzoic acid anilide of the formula

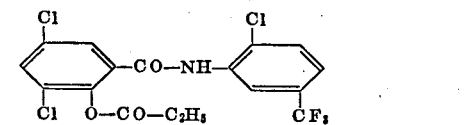

11. The method of claim 3 wherein said 2-acyloxybenzoic acid anilide is a compound of the formula

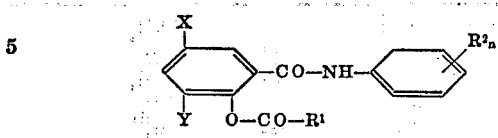

in which
$R^1$ is straight or branched lower alkyl or alkoxy with up to 4 carbon atoms,
$R^2$ is chlorine, bromine, nitro or trihalomethyl,
$n$ is 1 or 2,
X is chlorine or bromine, or X is hydrogen provided that Y is nitro, and
Y is chlorine, bromine or nitro, or Y is hydrogen provided that X is chlorine and $R^1$ is alkoxy of 1 to 4 carbon atoms.

References Cited
UNITED STATES PATENTS

| | | | |
|---|---|---|---|
| 3,632,760 | 1/1972 | Shen et al. | 424—311 |
| 3,079,297 | 2/1963 | Schraufstätter et al. | 424—230 |
| 3,113,067 | 12/1963 | Strufe et al. | 424—230 |
| 3,332,996 | 7/1967 | Zerweck et al. | 424—230 |

VINCENT D. TURNER, Primary Examiner

U.S. Cl. X.R.
260—463, 479 R; 424—311

UNITED STATES PATENT OFFICE
CERTIFICATE OF CORRECTION

Patent No. 3,823,236          Dated July 9, 1974

Inventor(s) Karl Heinz Büchel et al.

It is certified that error appears in the above-identified patent and that said Letters Patent are hereby corrected as shown below:

Col. 1, line 56, cancel "or".

Col. 3, line 7, correct spelling of "Podosphaera".

Col. 3, line 54, correct spelling of "hexane".

Col. 4, line 69, cancel " It .......the" and substitute

-- go above or below the aforementioned --.

Col. 9, Table 5, Compound (1), correct formula to read as follows:

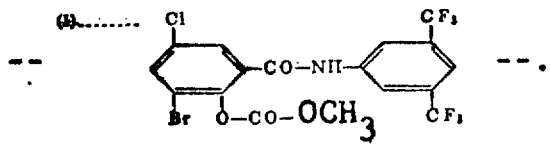

Col. 12, in the Table, Compound (5), under the heading "Melting

Point,°C " cancel "1 6" and substitute -- 156 --.

Col. 14, in the Table, Compound (57), under the heading

"Melting Point, °C", cancel "79" and substitute

-- 76 --.

Col. 14, line 37, Claim 3, after "Y is", insert -- nitro, or

Y is --.

Signed and sealed this 8th day of October 1974.

(SEAL)
Attest:

McCOY M. GIBSON JR.

C. MARSHALL DANN
Commissioner of Patents